United States Patent [19]

Greigger et al.

[11] 4,439,239

[45] Mar. 27, 1984

[54] PIGMENTED COATING COMPOSITION CONTAINING A MIXTURE OF ALKOXYSILANES

[75] Inventors: Paul P. Greigger, Allison Park; William G. Boberski, Gibsonia; Jerome A. Seiner, Pittsburgh, all of Pa.

[73] Assignee: PPG Industries, Inc., Pittsburgh, Pa.

[21] Appl. No.: 384,369

[22] Filed: Jun. 2, 1982

[51] Int. Cl.$^3$ ............................ C09K 3/14; B32B 9/64
[52] U.S. Cl. .................... 106/287.16; 528/12; 528/20
[58] Field of Search ............ 528/12, 20; 106/287.12, 106/287.16

[56] References Cited

U.S. PATENT DOCUMENTS

| | | | |
|---|---|---|---|
| 2,568,384 | 9/1951 | Cheronis | 260/33.6 |
| 2,610,167 | 9/1952 | TeGrotenhuis | 260/37.5 |
| 2,676,182 | 4/1954 | Daudt et al. | 260/448.2 |
| 2,786,042 | 3/1957 | Iler et al. | 260/37 |
| 3,232,771 | 2/1966 | Pearce | 106/38.35 |
| 3,435,001 | 3/1969 | Merrill et al. | 260/46.5 |
| 3,682,668 | 8/1972 | Fujita et al. | 106/74 |
| 3,894,881 | 7/1975 | Suzuki et al. | 106/287 |
| 3,959,566 | 5/1976 | Pangonis | 428/446 |
| 3,976,497 | 8/1976 | Clark | 106/287 |
| 3,986,997 | 10/1976 | Clark | 260/29.2 |
| 4,016,129 | 4/1977 | Miyosawa | 260/29.6 |
| 4,027,073 | 5/1977 | Clark | 428/412 |
| 4,113,665 | 9/1978 | Law et al. | 260/37 |
| 4,127,697 | 11/1978 | Laurin | 428/412 |
| 4,159,206 | 6/1979 | Armbruster et al. | 106/287 |
| 4,170,690 | 10/1979 | Armbruster et al. | 428/447 |
| 4,173,490 | 11/1979 | Rotenberg et al. | 106/287.14 |
| 4,173,553 | 11/1979 | Haluska | 260/29.2 |
| 4,177,315 | 12/1979 | Ubersax | 428/336 |
| 4,197,230 | 4/1980 | Baney et al. | 260/29.2 |
| 4,207,357 | 6/1980 | Goossens | 427/162 |
| 4,218,354 | 8/1980 | Hayati et al. | 528/12 |
| 4,223,072 | 9/1980 | Baney et al. | 428/412 |
| 4,229,228 | 10/1980 | Rotenberg et al. | 106/287.14 |
| 4,243,692 | 1/1981 | Scholze et al. | 427/2 |
| 4,275,118 | 6/1981 | Baney et al. | 428/412 |
| 4,278,804 | 7/1981 | Ashby et al. | 556/416 |
| 4,290,811 | 9/1981 | Brown et al. | 106/1.17 |
| 4,299,746 | 11/1981 | Frye | 260/29.2 |
| 4,308,315 | 12/1981 | Frye | 428/331 |
| 4,311,738 | 1/1982 | Chi | 427/387 |
| 4,390,373 | 6/1983 | White et al. | 106/287.12 |

FOREIGN PATENT DOCUMENTS 2036053 6/1980 United Kingdom .
2036054 6/1980 United Kingdom .

*Primary Examiner*—Theodore Morris
*Attorney, Agent, or Firm*—Thomas M. Breininger

[57] ABSTRACT

Disclosed are coating compositions containing pigment in a vehicle comprising a dispersion of colloidal silica, a mixture of a hydrolyzable trialkoxysilane and a hydrolyzable dialkoxysilane, alcohol, water and sufficient acidifying agent to provide a pH of the vehicle ranging from about 2.8 to about 6.0.

7 Claims, No Drawings

PIGMENTED COATING COMPOSITION CONTAINING A MIXTURE OF ALKOXYSILANES

BACKGROUND OF THE INVENTION

1. Field of Invention

This invention relates to coating compositions containing colloidal silica and alkoxysilanes, methods of preparation and use, and coated articles.

2. Description of the Prior Art

U.S. Pat. No. 3,976,497 to Clark relates to a paint composition comprising a pigment carried in a vehicle consisting essentially of a dispersion of colloidal silica in a lower aliphatic alcohol-water solution of the partial condensate of a silanol of the formula $RSi(OH)_3$ in which R is selected from specified groups, at least 70 weight percent of the silanol being $CH_3Si(OH)_3$. The vehicle contains 10 to 50 weight percent solids consisting essentially of 10 to 70 weight percent colloidal silica and 30 to 90 weight percent of the partial condensate. The vehicle further contains sufficient acid to provide a pH in the range of 3.0 to 6.0. While useful for some purposes, these compositions tend to lose adhesion from a steel substrate after curing if applied so as to produce dry film thicknesses greater than about 0.5 mil ($1.27 \times 10^{-5}$ meters).

U.S. Pat. No. 4,159,206 to Armbruster et al relates to an unpigmented coated composition comprising colloidal silica and a mixture of dialkyldialkoxysilane and alkyltrialkoxysilane such as dimethyldimethoxysilane and methyltrimethoxysilane prepared by adding a mixture of dialkoxysilane and trialkoxysilane, to colloidal silica hydrosols and adjusting the pH with sufficient acid to provide a pH in the range of 3.0 to 6.0.

U.S. Pat. No. 3,986,997 to Clark relates to a pigment-free coating composition comprising essentially the same components as in U.S. Pat. No. 3,976,497 to Clark described above except without pigment.

U.S. Pat. No. 4,197,230 to Baney et al relates to a modification in the pigment-free compositions shown in U.S. Pat. No. 3,986,997 to Clark by incorporation into the Clark composition of at least 1 weight percent of $\phi Si(OH)_3$ based on the weight of total $RSi(OH)_3$ present in the composition.

SUMMARY OF THE INVENTION

Compositions of the present invention contain pigment in a vehicle comprising a dispersion of colloidal silica, a mixture of a hydrolyzable trialkoxysilane and a hydrolyzable dialkoxysilane, water, acidifying agent, and an alcohol. While compositions of the invention are useful as coating compositions in general, they are especially useful in producing pigmented, highly adherent, crack resistant, glossy, heat and corrosion resistant coatings on metal substrates. The compositions are particularly useful where glossy, highly adherent, crack and high temperature resistant coatings are desired and may function as replacements for porcelain in certain applications.

DETAILED DESCRIPTION OF THE INVENTION

A composition of the invention comprises:
  I. a pigment; in
  II. a vehicle comprising,
    A. a dispersion of colloidal silica,
    B. a mixture of (i) hydrolyzable trialkoxysilane and (ii) hydrolyzable dialkoxysilane,
    C. alcohol,
    D. water, and
    E. sufficient acidifying agent to provide a pH of the vehicle ranging from about 2.8 to 6.0.

The silica is present in the vehicle in the form of a colloidal dispersion. It is to be understood that the colloidal silica may be provided from any suitable source including, for example, colloidal silica dispersed in essentially an organic solvent such as ethylene glycol monoethyl ether and colloidal silica dispersed in water. However, it is preferred to utilize an aqueous dispersion of colloidal silica as the source of colloidal silica for the vehicle in a composition of the invention.

Aqueous dispersions of colloidal silica suitable in the present invention generally have an average silica particle size ranging from about 4 to 150 millimicrons (about $50 \times 10^{-10}$ to $1500 \times 10^{-10}$ meters). These silica dispersions are generally known, examples of which include those sold under the trademarks of "Ludox" (E. I. du Pont de Nemours), "Nalcoag" (NALCO Chemical Company) and "Nyacol" (PQ Corporation). Such colloidal silicas are available as both acidic and basic hydrosols and both types are suitable for the purposes of the present invention.

Basic, aqueous dispersions of colloidal silica such as "Nalcoag 1060" are suitable, and in certain circumstances are even preferable. The pH of these basic colloidal silicas is adjusted using an acidifying agent during preparation of the compositions of the invention. Colloidal silicas are to be distinguished from either water dispersible forms of $SiO_2$, such as polysilicic acid or aqueous alkali metal silicates.

Hydrolyzable trialkoxysilanes useful in compositions of the invention generally correspond to the formula

$RSi(OR')_3$ wherein,
  R is selected from the group consisting of alkyl radicals having 1 to 5 carbon atoms, the phenyl radical, the vinyl radical, the 3,3,3-trifluoropropyl radical, the gamma-glycidoxypropyl radical, and the gamma-methacryloxypropyl radical, and
  R' is selected from the group consisting of methyl, ethyl, n-propyl, isopropyl, and n-butyl.

Examples of hydrolyzable trialkoxysilanes include: methyltrimethoxysilane, methyltriethoxysilane, propyltrimethoxysilane, propyltriethoxysilane, phenyltrimethoxysilane, vinyltrimethoxysilane, vinyltriethoxysilane, gamma-methacryloxypropyltrimethoxysilane, gamma-methacryloxypropyltriethoxysilane, gamma-glycidoxypropyltrimethoxysilane, and gamma-glycidoxypropyltriethoxysilane. Of the above hydrolyzable trialkoxysilanes, methyltrimethoxysilane is preferred. Mixtures of trialkoxysilanes also may be used in compositions of the invention.

Hydrolyzable dialkoxysilanes useful in compositions of the invention generally correspond to the formula

$R R''Si(OR')_2$ wherein,
  R and R'' independently are selected from the group consisting of alkyl radicals having 1 to 5 carbon atoms, the phenyl radical, the vinyl radical, the gamma-glycidoxypropyl radical, and the gamma-methacryloxypropyl radical, and R' is selected from the group consisting of methyl, ethyl, n-propyl, isopropyl, and n-butyl.

Examples of hydrolyzable dialkoxysilanes include dimethyldimethoxysilane, dimethyldiethoxysilane, dipropyldimethoxysilane, dipropyldiethoxysilane, methylphenyldimethoxysilane, methyl(gamma-glycidoxypropyl) dimethoxysilane, and methyl (gamma-methacryloxypropyl)dimethoxysilane. Of the above dialkoxysilanes, dimethyldimethoxysilane is preferred. Mixtures of dialkoxysilanes also may be used in compositions of the invention.

The trialkoxysilanes and dialkoxysilanes suitable for compositions of the present invention are hydrolyzable materials which in aqueous media can hydrolyze at least partially to the corresponding silanols which can at least partially condense to form mixtures of compounds containing siloxane linkages. For example, hydrolysis of alkoxysilanes containing methoxy, ethoxy, propoxy and n-butoxy substituents produces the corresponding alcohols and silanols. The silanols can partially condense in aqueous media to form

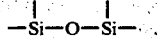

linkages. The condensation, for example, in acidic aqueous media takes place over a period of time and may not be complete such that the siloxane material may retain an appreciable quantity of silicon-bonded hydroxyl groups. The presence of these residue hydroxyl groups in partially condensed alkoxysilanes are believed to not only contribute to the solubility of the condensed material in water but also to provide sites for at least partial reaction with hydroxyl groups believed to be present at the surface of colloidal silica particles in the aqueous dispersion of colloidal silica. Although alkoxysilanes which have been hydrolyzed and partially condensed without the presence of the colloidal silica are useful in compositions of the invention, it is preferred that the compositions contain a mixture of trialkoxysilanes and dialkoxysilane hydrolyzed and partially condensed in the presence of colloidal silica. Cured coatings prepared from mixtures of hydrolyzable trialkoxysilanes and hydrolyzable dialkoxysilanes partially condensed in the presence of colloidal silica typically are more adherent to the substrate and crack resistant than those prepared from mixtures of the alkoxysilanes hydrolyzed and partially condensed separate from the colloidal silica component.

Alcohols useful in compositions of the invention typically include lower aliphatic alcohols which are miscible with water such as methanol, ethanol, isopropanol and tertiary-butanol. Mixtures of such alcohols can be utilized. Of the above alcohols, isopropanol is preferred and when mixtures of alcohols are used, it is preferred that at least 25 weight percent of isopropanol be present in such mixture.

The vehicle of the composition contains sufficient acidifying agent to provide a pH ranging from about 2.8 to about 6.0 preferably ranging from about 3.5 to about 4.5.

Suitable acidifying agents include both organic and inorganic acids such as hydrochloric, acetic, chloroacetic, citric, benzoic, dimethylmalonic, formic, glutaric, glycolic, maleic, malonic, toluene-sulfonic, oxalic and the like.

Although the acids described above may be used to acidify the vehicle of a composition of the invention, it has been discovered that certain soluble metal acid phosphates such as aluminum dihydrogen phosphate, calcium dihydrogen phosphate, chromium (III) dihydrogen phosphate, iron (III) dihydrogen phosphate, manganese (II) dihydrogen phosphate, and the like can be utilized to provide the appropriate pH in the vehicle and, in fact, are preferred. Compositions containing such soluble metal acid phosphates are the subject of U.S. patent application to Paul P. Greigger filed the same day as the present application. Of the soluble metal acid phosphates described above, aluminum dihydrogen phosphate is preferred.

The vehicle portion of a composition of the invention typically is prepared by adding the trialkoxysilane and the dialkoxysilane either separately or in combination to an aqueous dispersion of colloidal silica and adjusting the pH to the desired level by addition of the acidifying agent, preferably by addition of the soluble metal acid phosphate. As used herein the vehicle is understood to include the components of the composition except for the pigment. The acidifying agent can be added to either the alkoxysilanes or to the colloidal silica prior to mixing the alkoxysilanes with the aqueous colloidal silica. Typically the acidifying agent is combined with the aqueous dispersion of colloidal silica before combining the alkoxysilanes with the silica. The amount of acidifying agent necessary to obtain the desired pH will vary with the alkali metal content of the silica but is usually less than 1 percent by weight of the composition. Alcohol is generated by hydrolysis of the silicon-bonded alkoxy substituents. For example, hydrolysis of one mole of methyltrimethoxysilane, assuming complete hydrolysis of the methoxy substituents, can generate 3 moles of methanol. Alcohol generated as a result of the hydrolysis of the alkoxysilanes is to be considered at least part of the alcohol component of a composition of the invention. Depending upon the weight percent solids desired in the final vehicle component, additional alcohol, water, or a water miscible solvent such as acetone, butyl cellosolve and the like, can be added.

Following combination of the aqueous colloidal silica, di- and trialkoxysilanes, and acidifying agent, the vehicle is stirred at room temperature typically for several hours. During this period the vehicle becomes an essentially one phase material while hydrolysis and partial condensation occurs. The vehicle thus obtained typically is a milky white, low viscosity dispersion which generally is stable against gellation at room temperature for 6 months or longer. Preferred compositions in which the acidifying agent is a soluble metal acid phosphate as described previously, typically are stable at 120° F. (48.9° C.) for periods at least as long as 4 weeks or longer.

Optionally, latent condensation catalysts and catalysts for the vehicle as described in U.S. Pat. No. 3,976,497 at column 3, lines 38–62 can be incorporated in the compositions of the present invention and lines 38–62, column 3, of U.S. Pat. No. 3,976,497 are hereby incorporated by reference. However, it has been found that compositions of the present invention, particularly those prepared with the above described soluble metal acid phosphates, which cure to films having excellent properties, can be prepared without the catalysts described in U.S. Pat. No. 3,976,497, and compositions of the present invention which do not contain such catalysts are in fact preferred.

A wide variety of pigments can be incorporated in compositions of the invention. Examples of suitable pigments include: white and colored pigments based on titanium dioxide, iron oxide red, iron oxide black, manganese black, carbon in its various forms, barium yellow, strontium chromate, calcium chromate, zinc yellow, zinc green, cadmium yellow, cadmium red, cadmium vermilion, cadmopone, vermilion, ultramarine, lead chromate, chromium yellow, molybdate red, molybdate orange, chromoxide green, chromoxide hydrate green, manganese violet, manganese blue, cobalt blue, cobalt green, cobalt violet, naples yellow, alkaline earth carbonates such as chalk, magnesium carbonate, dolomite, precipitated calcium carbonate and barium carbonate, talc, alumina hydrates, zinc oxide, magnesium oxide, fluorite, basic lead carbonate, organic pigments of the azo series, and mixtures thereof. Ceramic and vitreous frits can also be used in the pigment portion of compositions of the invention Powdered metals such as zinc dust, aluminum flakes, bronze powder and the like, form another class of pigments suitable for use in the present invention. Glass beads can be incorporated in the pigments to provide a reflective coating such as used on highway signs and pavement markings. The pigments listed above are merely illustrative of the large number of generally known pigments. A detailed listing of the organic and inorganic pigments can be found in *The Encyclopedia of Chemistry*, Clark and Hawley, Reinhold Publishing Corp., New York (1966) beginning at page 833.

Typically, the pigment is incorporated in a composition of the invention following combination of the colloidal silica, water, di- and trialkoxysilanes, and acidifying agent.

Coating compositions of the invention may include additives generally known in the art such as dyes, defoamers, release agents, anti-mar agents, flow control agents, surfactants, thickeners, fungicides and mildewcides.

As stated previously, the vehicle is understood to include the components of the composition of the invention except for pigment. Thus, the vehicle of a composition of the invention is understood to include, for example, the colloidal silica, the mixture of hydrolyzable alkoxysilanes, the alcohol, the water, the acidifying agent, and any organic solvents and additives which may be present. The water is understood to include water from any source, for example, the water in an aqueous dispersion of colloidal silica which typically is used to provide the colloidal silica in a composition of the invention, and water which can be added separately during formulation of a composition of the invention as, for example, where a dispersion of colloidal silica in organic solvent rather than water is used as the source of colloidal silica.

The vehicle component of a composition of the invention generally contains from about 10 to about 60 percent by weight total solids based on the sum of silica solids and alkoxysilanes by weight (i.e., excluding pigment) in the total weight of the vehicle. Whenever used herein, the alkoxysilane solids from the di- and trialkoxysilanes are calculated on the basis of the corresponding hydrolyzed species (i.e., the corresponding silanols) assuming for purposes of calculation a theoretical extent of hydrolysis of 100 percent. Thus, for example, the amount of dimethyldimethoxysilane as a percent of total solids of a composition would be calculated on the basis of the corresponding silanol, $(CH_3)_2 Si(OH)_2$.

The ratio by weight of trialkoxysilane to dialkoxysilane solids (calculated on the basis of the corresponding hydrolyzed species as discussed above) may vary widely. However, in preferred compositions the ratio by weight of trialkoxysilane to dialkoxysilane solids, respectively, typically ranges from about 93:7 to about 50:50.

The amount of silica solids (calculated as $SiO_2$) in the vehicle as a percent of the solids defined above generally ranges from about 10 to about 80 percent by weight, preferably from about 40 to about 60 percent by weight. The amount of alkoxysilane solids as a percent of total solids defined above generally ranges from about 20 to about 90 percent by weight of the total solids, the alkoxysilane solids calculated on the basis of the hydrolyzed species assuming for purposes of calculation theoretically complete hydrolysis of the alkoxysilanes to the respective silanols.

The amount of water in a composition of the invention may vary widely. The amount by weight of water based on the total weight of the vehicle component of a composition of the invention generally may range from about 1 percent to about 90 percent by weight, and typically ranges from about 10 percent to about 70 percent by weight.

The amount of pigment in a composition of the invention may vary widely, but typically ranges from about 10 to about 80 percent by volume solids, based on the total volume of solids present in the composition. Where highly glossy, pigmented, cured coatings are desired, typically an amount of pigment up to about 40 percent by volume solids is employed.

The ratio of the weight of pigment to the weight of binder (i.e., P/B ratio) in a composition of the invention will vary, for example, depending on the density of the pigment utilized in the composition. However, generally the P/B ratio in a composition of the invention ranges from 0.1/1 to about 10/1, and typically, where glossy cured coatings are desired, ranges from about 0.1/1 to about 2/1. As used in the present context, the binder is understood to include the silica solids calculated as $SiO_2$ and the alkoxysilanes calculated on the basis of the corresponding hydrolyzed species assuming for purposes of calculation a theoretical extent of hydrolysis of 100 percent.

Compositions of the invention are particularly useful as coating compositions to provide cured films which are glossy, highly adherent and crack resistant even at high temperatures. Coatings prepared from pigmented compositions of the present invention utilizing the combination of trialkoxysilanes and dialkoxysilanes are not nearly as subject to the problems of loss of adhesion to the substrate and cracking as are, for example, the coatings prepared from the pigmented compositions disclosed in U.S. Pat. No. 3,976,497, particularly at dry film thicknesses greater than about 0.5 mils ($1.27 \times 10^{-5}$ meters). The ability of compositions of the present invention to resist loss of adhesion and cracking at such higher dry film thicknesses is especially important considering the difficulty in controlling application parameters for coating compositions to consistently provide thin dry film thicknesses, for example, of less than about 0.5 mils ($1.27 \times 10^{-5}$ meters). The resistance to loss of adhesion and cracking of cured films prepared from compositions of the invention even without incorporating reinforcing materials such as mica is especially noteworthy.

Compositions of the invention may be applied to a wide variety of substrates including, for example, metal, glass, ceramic materials, wood, wallboard, cement, and the like. They are especially useful for providing highly adherent coatings over metal substrates. Coating compositions of the invention also may be particularly useful as relatively low temperature curing substitutes for porcelain. The coating compositions may be applied by any known method including, for example, brushing, dipping, flow coating, doctor roll coating, spraying and the like. Generally known spray techniques and equipment may be utilized.

Properties of the cured compositions of the invention vary depending on the temperature at which the compositions are cured.

The following examples illustrate the invention. Amounts and percentages are by weight unless specified otherwise. When used herein, "pbw" means "parts by weight." Tests referred to in the following examples are conducted as follows.

TESTS (1) Adhesion—Adhesion is measured by scoring the coating down to the substrate with a razor blade in a crosshatch pattern thereby defining a plurality of approximately square areas each having a dimension of about 2 millimeters by 2 millimeters. Masking tape 2 inches wide (SCOTCH Masking Tape from 3M Corporation) is applied securely to the scored surface of the coating and then is ripped quickly from the scored area. The numerical value given for the test represents the scored area which is not removed by the tape.

(2) Hardness—An EAGLE Turquoise Drawing Pencil (from BEROL Corporation) is sharpened and the point is sanded to provide a flattened surface. The flattened tip is scraped at about a 45° angle to the coating while strong downward pressure is applied to the pencil. The value for hardness represents the designation of the "lead" in the hardest EAGLE Turquoise Drawing Pencil which does not scratch the coating in this test.

(3) Gloss 60°—The value for gloss 60° represents the percent specular reflectance of light from the surface of the coating at an angle of 60 degrees from the direction normal to the surface of the coating.

(4) Adhesion/Boiling Water—A substrate having a cured coating thereon is soaked in boiling water for 24 hours and thereafter rinsed with tap water and allowed to dry at room temperature. Next, the adhesion test described above is performed on the cured coating.

(5) Gloss 60°/Heat—A substrate having a cured coating thereon is heated at 700° F. (371° C.) for 6 hours. Next, the Gloss 60° test described above is performed on the cured coating.

(6) Adhesion/Heat—A substrate having a cured coating thereon is heated at 700° F. (371° C.) for 6 hours. Next, the first adhesion test described above is performed on the cured coating.

(7) Double Rubs/Water Soak—The number of double rubs is understood to mean the number of back and forth finger rubs with a cloth dipped in water across a coating that has been soaked in water at room temperature for 1 hour. The number of double rubs indicated is the number that the cured coating can withstand before the substrate becomes visible through the coating.

(8) Hardness/Heat—A substrate having a cured coating thereon is heated at 700° F. (371° C.) for 6 hours.

Next, the hardness test described above is performed on the cured coating.

EXAMPLE 1

(a) 60 pbw of aqueous colloidal silica having a silica solids content of 50 percent by weight and an average silica particle size of 60 millimicrons ($60 \times 10^{-9}$ meters) available as Nalcoag 1060 from NALCO Chemical Company is acidified at room temperature to a pH of $4.0 \pm 0.1$ with an aqueous solution of aluminum dihydrogen phosphate (from Alfa Products, Thiokol/Ventron Division, having the following analysis assay: 30 percent by weight as $P_2O_5$ and 7 percent by weight as $Al_2O_3$).

(b) Next, 37.0 pbw of methyltrimethoxysilane and 3.7 pbw of dimethyldimethoxysilane are mixed together and then added to the above acidified colloidal silica. The resulting composition is stirred at room temperature for about 18 to 24 hours. Following stirring, the composition is a one phase system.

(c) Next, 70 pbw of isopropanol is added to the composition produced in part (b) immediately above.

(d) Next, 43 pbw of a black inorganic pigment (available as Shepherd Black #101 from the Shepherd Chemical Company) is ground for about 5 minutes into the composition produced in part(c) immediately above using ZIRCOA beads spun by a TEFLON blade. The beads are then removed. The resulting material is a composition of the invention.

EXAMPLES 2-3

(a) The parts by weight indicated of the materials represented in the following TABLE 1 are combined in the following manner to produce the vehicles herein designated 2V and 3V.

Sufficient aqueous aluminum dihydrogen phosphate (described in Example 1) is added dropwise, at room temperature, with stirring to the aqueous colloidal silica to raise the pH of the aqueous colloidal silica to about 4. Next, a mixture of the methyltrimethoxysilane and the dimethyldimethoxysilane is added at room temperature with stirring to the aqueous colloidal silica whereupon a slight exotherm is observed. The resulting composition is stirred and allowed to hydrolyze for about 16 hours at room temperature. Next, the isopropanol is added at room temperature with stirring to produce the vehicle.

With 170.7 pbw of vehicle 2V and 137.4 pbw of vehicle 3V, each prepared as described above, is ground for 5 minutes utilizing ZIRCOA beads the amount by weight of pigment set forth in TABLE 1 to produce compositions of the invention herein designated 2C and 3C having a percent by volume of pigment of 22 percent and 10 percent, respectively.

TABLE 1

| Vehicle | 2V | 3V |
|---|---|---|
| Aqueous colloidal silica* | 60.0 | 60.0 |
| Aqueous aluminum dihydrogen phosphate** | To pH of about 4 | To pH of about 4 |
| Methyltrimethoxysilane | 37.0 | 37.0 |
| Dimethyldimethoxysilane | 3.7 | 3.7 |
| Isopropanol | 70.0 | 36.7 |
| Final Composition | 2C | 3C |
| Vehicle | 170.7 | 137.4 |

TABLE 1-continued

| | | |
|---|---|---|
| Pigment*** | 43.0 | 17.0 |

*Nalcoag 1060 described in EXAMPLE 1.
**From Alfa Products and described in EXAMPLE 1.
***A pigment composition containing oxides of copper, manganese and chromium available as Shepherd Black No. 101 from Shepherd Chemical Company.

(b) The ZIRCOA beads are filtered from compositions 2C and 3C. Next, each of compositions 2C and 3C is sprayed onto two aluminum panels (available as ALODINE 407-47 pretreated panels from Amchem Products, Inc.). The compositions are cured to a dry film thickness of about 0.5 mil at either 350° F. (177° C.) for 5 minutes or 600° F. (316° C.) for 30 minutes as set forth in the following TABLE 2. Next, tests (1) and (3) through (6) described above are performed on the cured coatings prepared from compositions 2C and 3C. The results of the tests are set forth in TABLE 2.

TABLE 2

| Coating | Cure | Gloss 60° | Adhesion | Adhesion/Boiling Water | Gloss 60°/Heat | Adhesion/Heat |
|---|---|---|---|---|---|---|
| 2C | 350° F./5 min | 22–28 | 95 | 0 | 17–19 | 95 |
| 2C | 600° F./30 min | 18–24 | 100 | 90 | 16–18 | 100 |
| 3C | 350° F./5 min | 59–68 | 100 | 10 | 53–56 | 95 |
| 3C | 600° F./30 min | 66–70 | 95 | 90 | 63–65 | 95 |

The following EXAMPLE 4 illustrates the excellent storage stability of a composition of the invention.

EXAMPLE 4

(a) To 120.0 pbw of aqueous colloidal silica (Nalcoag 1060) is added dropwise with stirring sufficient aqueous aluminum dihydrogen phosphate (described in Example 1) to raise the pH of the aqueous colloidal silica to about 4.

Next, a mixture containing 46.0 pbw of methyltrimethoxysilane, 20.8 pbw of phenyltrimethoxysilane and 6.95 pbw of phenylmethyldimethoxysilane is added at room temperature with stirring to the aqueous colloidal silica. The resulting composition is stirred at room temperature for about 16 hours. Next, 110.0 pbw of isopropanol is added at room temperature with stirring to the composition to produce a vehicle herein designated 4V.

40.0 pbw of mica coated with titanium dioxide (available as Gold Afflair ® from EM Laboratories, Inc.) is ground with the vehicle 4V for 2 minutes utilizing ceramic beads to produce a pigmented coating composition herein designated 4C.

(b) A first glass panel, $P_1$, is spray coated with pigmented composition 4C shortly after the composition is prepared. The coating is cured at 250° F. (121° C.) for 30 minutes and tests (1)–(3) are conducted on the cured coatings. The test results are summarized in the following TABLE 3.

A second glass panel, $P_2$, is spray coated with pigmented composition 4C which has been stored for 2 weeks at 120° F. (48.9° C.). The coating is cured at 250° F. (121° C.) for 30 minutes and tests (1)–(3) are conducted on the cured coatings. The tests results are summarized in TABLE 3.

A third glass panel, $P_3$, is spray coated with pigmented composition 4C which has been stored for 4 weeks at 120° F. (48.9° C.) and the coating cured and the tests conducted in the same manner as for the coatings on panels $P_1$ and $P_2$. The tests results are summarized in TABLE 3.

A fourth glass panel, $P_4$, is spray coated with pigmented composition 4C which has been stored for 4 weeks at 120° F. (48.9° C.) and has been allowed to remain at room temperature for an additional 85 days. The coating is cured and the tests conducted in the same manner as for the coatings on panels, $P_1$, $P_2$, and $P_3$. The tests results are summarized in TABLE 3.

TABLE 3

| | Adhesion | Gloss 60° | Hardness |
|---|---|---|---|
| $P_1$/Composition 4C applied shortly after preparation | 95 | 15 | 3H |
| $P_2$/Composition 4C applied after 2 weeks at 120° F. | 95 | 13 | H |
| $P_3$/Composition 4C applied after 4 weeks at 120° F. | 90 | 12 | 3H |
| $P_4$/Composition 4C applied after 4 weeks at 120° F. followed by 85 days at room temperature | 95 | 11–12 | 3H |

Thus composition 4C is not only storage stable for at least 4 weeks at 120° F., but the cured coatings prepared from the stored composition 4C exhibit excellent properties.

The following EXAMPLES 5–11 illustrate coating compositions showing various ratios by weight of trialkoxysilane to dialkyoxysilane and some properties of the cured coatings prepared therefrom. The ratios by weight of triakoxysilane to dialkoxysilane solids calculated on the basis of the corresponding silanols in compositions 10C and 11C fall outside the range of about 93:7 to about 50:50 for preferred compositions as discussed previously.

EXAMPLES 5–11

(a) The ingredients set forth in the following TABLE 4 are combined in the following manner to produce pigmented coating compositions herein designated 5C through 11C.

First a mixture of the aqueous colloidal silica and water is acidified to a pH in the range of 4–5. Next, the isopropanol or a mixture of isopropanol and ethylene glycol monoethyl ether is added with stirring to the acidified aqueous colloidal silica. Next, a mixture of the methyltrimethoxysilane and dimethyldimethoxysilane is added with stirring to the mixture containing the aqueous colloidal silica and isopropanol. The resulting composition is stirred at room temperature for about 16 hours after which the pigment is added to and dispersed in the composition to produce a pigmented coating composition containing 40 percent by volume pigment based on the total volume of solids in the coating composition. The ratio by weight of methyltrimethoxysilane to dimethyldimethoxysilane for each of coating compositions 5C through 11C is also set forth in TABLE 4. This ratio of alkoxysilanes is calculated on the basis of the corresponding silanols, that is $CH_3Si(OH)_3$ and $(CH_3)_2Si(OH)_2$.

TABLE 4

| Composition | 5C | 6C | 7C | 8C | 9C | 10C | 11C |
|---|---|---|---|---|---|---|---|
| Colloidal silica[1] | 59.9 | 59.9 | 59.9 | 59.9 | 59.9 | 59.9 | 59.9 |
| Water | 25.9 | 25.9 | 102.0 | 25.9 | 25.9 | 25.9 | 25.9 |

TABLE 4-continued

| Composition | 5C | 6C | 7C | 8C | 9C | 10C | 11C |
|---|---|---|---|---|---|---|---|
| Aluminum dihydrogen phosphate[2] | To raise pH of colloidal silica and water to 4-5 | | | | | | |
| Isopropanol | 31.2 | 62.4 | — | 31.4 | 31.9 | 32.3 | 32.6 |
| Ethylene glycol monoethyl ether | 35.3 | — | — | 35.5 | 36.0 | 36.5 | 36.8 |
| Methyltrimethoxysilane | 36.5 | 36.5 | 36.5 | 30.5 | 20.3 | 10.1 | 4.1 |
| Dimethyldimethoxysilane | 3.2 | 3.2 | 3.2 | 8.1 | 16.2 | 24.3 | 29.2 |
| Titanium dioxide[3] | 77.9 | 77.9 | 77.9 | 80.4 | 83.7 | 87.2 | 89.5 |
| % by volume pigment | 40 | 40 | 40 | 40 | 40 | 40 | 40 |
| $CH_3Si(OH)_3$/$(CH_3)_2Si(OH)_2$ | 103/10 | 103/10 | 103/10 | 33.9/10 | 11.3/10 | 3.75/10 | 1.27/10 |
| P/B[4] | 1.35/1 | 1.35/1 | 1.35/1 | 1.40/1 | 1.48/1 | 1.57/1 | 1.62/1 |

[1]Nalcoag 1060 described in Example 1.
[2]Aqueous aluminum dihydrogen phosphate from ALFA Products described in Example 1.
[3]Pigment available as R-900 from E. I. duPont de Nemours and Company.
[4]Ratio by weight of pigment to binder.

(b) Each of the coating compositions 5C through 11C is spray coated to approximately the same film thickness onto a metal phosphate pretreated steel panel (BONDERITE-40 from Parker Division of Oxymetal Corp.) and a metal chromate/metal phosphate pretreated aluminum panel (ALODINE 407-47 from Amchem Products, Inc.). The coatings are cured at 250° F. (121° C.) for 30 minutes and tests (1) through (3) and (5) through (8) as described previously are performed on each of the cured coatings. The test results are summarized in the following TABLE 5.

TABLE 5

| Composition | 5C | 6C | 7C | 8C | 9C | 10C | 11C |
|---|---|---|---|---|---|---|---|
| Adhesion | | | | | | | |
| Aluminum | 100 | 100 | 100 | 100 | 100 | 100 | 100 |
| Steel | 100 | 100 | 100 | 100 | 100 | 100 | 100 |
| Hardness | | | | | | | |
| Aluminum | 2H | 3H | 2H | 2H | H | B | <4B |
| Steel | 8H | 8H | 8H | 8H | 2H | B | 4B |
| Double Rubs/Water Soak | | | | | | | |
| Aluminum | >200 | >200 | >200 | >200 | >200 | >200 | 25 |
| Steel | >200 | >200 | >200 | >200 | >200 | 100 | 7 |
| Gloss 60° | | | | | | | |
| Aluminum | 82-86 | 72-82 | Not measured/Many craters in film | 89-93 | 88-90 | 81-85 | 70-79 |
| Steel | 72-79 | 66-77 | | 75-80 | 81-86 | 74-80 | 61-66 |
| Adhesion/Heat | | | | | | | |
| Aluminum | 100 | 100 | — | 100 | 100 | 100 | 95 |
| Steel | 70 | 80 | — | 70 | 95 | 90 | 5 |
| Gloss 60°/Heat | | | | | | | |
| Aluminum | 82-84 | 73-78 | — | 86-88 | 88-92 | 81-83 | 67-73 |
| Steel | 72-73 | 55-61 | — | 75-80 | 81-85 | 71-76 | 55-60 |
| Hardness/Heat | | | | | | | |
| Aluminum | 3H | 3H | — | 3H | 3H | H | 4B |
| Steel | >9H | >9H | — | >9H | 8H | H | <4B |

The following Examples 12-14 illustrate the improved adhesion (in the sense of resistance to flaking) of pigmented cured coatings prepared from compositions utilizing both methyltrimethoxysilane and dimethyldimethoxysilane over pigmented cured coatings prepared from compositions utilizing only the methyltrimethoxysilane.

In Examples 12-14, only, "adhesion loss" refers to the percent area of the substrate from which the coating flakes off with time without the application of any external agent (such as tape) to remove the coating.

EXAMPLES 12 THROUGH 14

(a) The ingredients set forth in the following TABLE 6 are combined in the following manner to produce the vehicles herein designated 12V through 14V.

Sufficient glacial acetic acid is added dropwise at room temperature with stirring to the aqueous colloidal silica to raise the pH of the aqueous colloidal silica to 4.8. Next, the methyltrimethoxysilane or mixture of the methyltrimethoxysilane and the dimethyldimethoxysilane is added at room temperature with stirring to the aqueous colloidal silica. The resulting composition is stirred and allowed to hydrolyze for about 16 hours at room temperature. Next, the isopropanol is added at room temperature with stirring to produce the vehicle.

Each of the vehicles 12V-14V is ground for 5 minutes utilizing ZIRCOA beads with the amount by weight of pigment set forth in TABLE 6 to produce compositions of the invention herein designated 12C through 14C.

TABLE 6

| Vehicle | 12V | 13V | 14V |
|---|---|---|---|
| Aqueous colloidal silica[1] | 75.0 | 75.0 | 75.0 |
| Acetic acid[2] | pH of 4.8 | pH of 4.8 | pH of 4.8 |
| Methyltrimethoxysilane | 68.0 | 61.2 | 50.9 |

TABLE 6-continued

| | | | |
|---|---|---|---|
| Dimethyldimethoxysilane | 0 | 6.1 | 15.4 |
| Isopropanol | 94.7 | 94.7 | 94.7 |
| Final Composition | 12C | 13C | 14C |
| Pigment[3] | 52.6 | 52.6 | 52.6 |

[1] Aqueous colloidal silica having a silica solids content of 40 percent by weight available as Ludox HS-40 from E. I. duPont de Nemours and Company.
[2] Glacial acetic acid.
[3] Titanium dioxide available as R-900 from E. I. duPont de Nemours and Company.

(b) Pigmented coating compositions 12C through 14C are applied to several metal phosphate pretreated, 4 inch by 12 inch, steel panels (BONDERITE-40) by spraying the panels in one, two, or three passes allowing the panels to partially dry for between 1 and 1.5 minutes between passes. The spray-applied coatings are allowed to dry in air for 2 days after which the dry film thickness of the coating is measured. After this measurement some of the coatings, herein designated Group 1, are set aside at room temperature. Next, some of the coatings herein designated Group 2 are heated for 30 minutes at 250° F. (121° C.) and thereafter allowed to cool for 30 minutes. The Group 2 coatings prepared from compositions 12C and 13C are then checked for loss of adhesion (flaking). The results for Group 2 coatings falling within the various ranges of dry film thickness (DFT) prepared from compositions 12C and 13C are summarized in the following TABLE 7.

TABLE 7

| Group | Composition | DFT (mil) | Loss of Adhesion (flaking) |
|---|---|---|---|
| Group 2 | 12C | 0.9–1.1 | 100% |
| Group 2 | 13C | 0.9–1.1 | 20% |
| Group 2 | 12C | 0.65–0.8 | 40% |
| Group 2 | 13C | 0.65–0.8 | 10% |

The Group 2 panels having cured coatings thereon of 0.65–0.8 mil dry film thickness prepared from compositions 12C and 13C are allowed to remain in air at room temperature for an additional 3½ hours (i.e., after the 30 minute cooling period described above). Next, these panels are again checked for loss of adhesion (flaking). The panels prepared from composition 12C show an additional loss of adhesion of 20 percent to a total of 60 percent. The panels prepared from composition 13C show no additional loss of adhesion.

(c) Panels having Group 1 coatings (described in part(b) above) of various film thicknesses are allowed to remain at room temperature for a total of 28 days after the coatings have been spray applied to the panels.

Panels having Group 2 coatings (described in part (b) above) of various film thicknesses are allowed to remain at room temperature following the previously described heating for 30 minutes at 250° F. (121° C.) until a total time of 28 days has elapsed after the coatings have been spray applied to the panels.

Next, these panels from both Groups 1 and 2 are checked for loss of adhesion at the end of the 28 day period. The results are summarized in the following TABLE 8.

TABLE 8

| Group | Composition | DFT (mil) | Loss of Adhesion (flaking) |
|---|---|---|---|
| 1 | 12C | 0.9–1.1 | 95% |
| 2 | 12C | 0.9–1.1 | 100% |
| 1 | 13C | 0.9–1.1 | 0% (some cracking at edge of panel) |
| 2 | 13C | 0.9–1.1 | 25% |
| 1 | 14C | 0.9–1.1 | 0% |
| 2 | 14C | 0.9–1.1 | 0% (some cracking at edge of panel) |
| 1 | 12C | 0.65–0.8 | 0% (some cracking at edge of panel) |
| 2 | 12C | 0.65–0.8 | 85% |
| 1 | 13C | 0.7–0.8 | 0% |
| 2 | 13C | 0.7–0.8 | 10% |
| 1 | 14C | 0.5–0.65 | 0% |
| 2 | 14C | 0.5–0.65 | 0% (some cracking at edge of panel) |
| 1 | 12C | 0.25–0.4 | 0% |
| 2 | 12C | 0.25–0.4 | 0% (some cracking at edge of panel) |
| 1 | 13C | 0.25–0.4 | 0% |
| 2 | 13C | 0.25–0.4 | 0% (some cracking at edge of panel) |
| 1 | 14C | 0.3–0.4 | 0% |
| 2 | 14C | 0.3–0.4 | 0% (some cracking at edge of panel) |

What is claimed is:
1. A composition comprising:
I. a pigment in an amount ranging from about 10 to about 80 percent by volume solids based on the total volume of solids present in said composition; in
II. a vehicle comprising,
  A. a dispersion of colloidal silica,
  B. a mixture of (i) a hydrolyzable trialkoxysilane and (ii) a hydrolyzable dialkoxysilane,
  C. an alcohol,
  D. water, and
  E. sufficient acidifying agent to provide a pH of the vehicle ranging from about 2.8 to about 6.0, wherein the ratio of the weight of the pigment to the weight of the sum of colloidal silica solids and alkoxysilane solids ranges from 0.1/1 to about 10/1, the alkoxysilane solids calculated assuming theoretically complete hydrolysis of the respective alkoxysilanes to the corresponding silanols, and wherein said composition cures to provide an opaque film.

2. The composition of claim 1 wherein said hydrolyzable trialkoxysilane corresponds to the formula $$RSi(OR')_3$$

wherein,
R is selected from the group consisting of alkyl radicals having 1 to 5 carbon atoms, the phenyl radical, the vinyl radical, the 3,3,3-trifluoropropyl radical, the gamma-glycidoxypropyl radical, and the gamma-methacryloxypropyl radical; and
R' is selected from the group consisting of methyl, ethyl, n-propyl, isopropyl, and n-butyl.

3. The composition of claim 2 wherein said hydrolyzable dialkoxysilane corresponds to the formula $$RR''Si(OR')_2$$

wherein,
R and R'' independently are selected from the group consisting of alkyl radicals having 1 to 5 carbon atoms, the phenyl radical, the vinyl radical, the 3,3,3-trifluoropropyl radical, the gamma-glycidoxypropyl radical, and the gamma-methacryloxypropyl radical, and R' is selected from the group consisting of methyl, ethyl, n-propyl, isopropyl, and n-butyl.

4. The composition of claim 3 wherein the ratio by weight of said trialkoxysilane to said dialkoxysilane, respectively, ranges from about 93:7 to about 50:50, said ratio calculated on the basis of the hydrolyzed species assuming theoretically complete hydrolysis to the respective silanols.

5. The composition of claim 1 wherein said vehicle contains about 10 to about 60 percent by weight total solids based on the sum by weight of colloidal silica solids and alkoxysilane solids in the total weight of the vehicle, the alkoxysilane solids calculated assuming theoretically complete hydrolysis of the respective alkoxysilanes to the corresponding silanols; colloidal silica solids representing about 10 to about 80 percent by weight of said sum; alkoxysilane solids from said mixture representing about 20 to about 90 percent by weight of said sum; and wherein the ratio by weight of said trialkoxysilane to said dialkoxysilane, respectively, in said mixture ranges from about 93:7 to about 50:50, the weights of trialkoxysilane and dialkoxysilane calculated assuming theoretically complete hydrolysis to the corresponding silanols.

6. The composition of claim 1 wherein said trialkoxysilane comprises methyltrimethoxysilane and said dialkoxysilane comprises dimethyldimethoxysilane.

7. The composition of claim 5 wherein said water is in an amount ranging from about 1 percent to about 90 percent by weight based on the total weight of said vehicle.

* * * * *